Patented Jan. 28, 1936

2,028,908

UNITED STATES PATENT OFFICE 2,028,908

POLYHYDRIC ALCOHOL-POLYBASIC ACID-MONOBASIC ALIPHATIC ACID ANHYDRIDE CONDENSATION PRODUCT AND PROCESS OF MAKING THE SAME

Gilbert F. Hoffmann, Milwaukee, Wis., assignor to Pittsburgh Plate Glass Company, a corporation of Pennsylvania No Drawing. Application June 26, 1929, Serial No. 373,948. Renewed May 20, 1933

11 Claims. (Cl. 260—8)

The present invention relates to improvements in resin-like materials and in solutions thereof, suitable for use as lacquers, coating compositions and the like.

The plastic materials hitherto produced by condensation reactions between glycerol, anhydrides of dibasic acids such as phthalic acid and monobasic acids have had but a limited value in the production of lacquers and coating compositions. The viscosity of their solutions in suitable solvents is relatively high, and the amount of solids which a suitable solution can carry is hence low. Their preparation is difficult owing to the rapidity with which they change in their solubilities in suitable solvent materials; the products soluble in the desirable lacquer solvents do not have sufficient hardness and are of high acidity. By operating in accordance with the present invention these defects are avoided and products excellently adapted for use in lacquers and coating compositions may be produced.

In carrying out the present invention, glycerol or other suitable polyhydric alcohol and an anhydride of a suitable dibasic organic acid are heated together, suitably in equimolecular proportions or with an excess of the anhydride. The heating is continued at a suitable temperature, say between 150 and 225° C. a plastic material being formed which gradually hardens. The operation is continued until a small sample, on cooling, shows that the product is hard, free from tackiness and still soluble in acetone. As will be hereinafter pointed out, in conducting the operation in accordance with the present invention, considerable latitude is permissible in the properties of the condensation product of the glycerol with the anhydride of the dibasic acid, without materially affecting the properties of the ultimate resinous or plastic material obtained; this in contradistinction to processes hitherto known, in which great care must be exercised to prevent excessive reaction at this point.

The condensation product resulting from this stage is now heated with an anhydride of a monobasic aliphatic acid, such as an acetic anhydride, suitably in approximately equimolecular proportions. The anhydride may be added gradually to the hot resin to prevent excessively vigorous reaction, the heating being effected under conditions which will prevent distillation of the anhydride; for example, under a reflux condenser or in an autoclave. By this means the glycerol is substantially completely esterified and the monobasic acid corresponding to the anhydride used is formed and distilled off through the reflux condenser.

The time of heating required to bring about reaction of the first or intermediate condensation product with the anhydride of the monobasic acid and the final condensation varies somewhat with the extent to which the reaction between the glycerol and the anhydride of the dibasic acid is carried. The farther it has been carried, the longer the required heating with the anhydride of the monobasic acid.

The later step is continued until no further acid is driven off, the later stages being conducted in an open receptacle to remove the last traces of water and acid. The final heating may be conducted at temperatures as high as 200 to 300° C., and a hard, resin-like material is obtained which retains its solubility in suitable lacquer and coating solvents such as ethyl and butyl acetates, the various glycol esters and alcohols, ketones and aromatic hydrocarbons. Its acidity is low, the "acid number" at the gelation point being in general below 9 (mgm. K. O. H. per gm.). The solutions produced are mobile (even with as high as 50 to 60% solids), adapted for brushing or spraying, and resins, oils and fatty acids may be incorporated therein to modify their properties.

A typical composition in accordance with the present invention may be prepared in the following manner:

A mixture of 92 parts of glycerol and 148 parts of phthalic anhydride is heated between 160° and 210° C. until a suitable plastic material is obtained. Small samples are taken at frequent intervals and allowed to cool. When a hard, non-tacky material, still soluble in acetone, is formed on cooling, 102 parts of acetic anhydride are added to the resin, which is then heated under a reflux condenser for 1 to 3 hours. The acetic anhydride is preferably added gradually to the hot resin to prevent too vigorous reaction and loss of acetic anhydride by distillation. The glycerol-phthalic anhydride condensation product dissolves and reacts with the acetic anhydride with the formation of acetic acid.

The heating is conducted in a receptacle provided with the reflux condenser in order to prevent distillation of acetic anhydride and to permit removal of water and acetic acid. The time of heating may vary, being dependent upon the extent to which the condensation of the glycerol and phthalic anhydride has been conducted in the initial step of the operation. However, the proper period may readily be determined by cessation of evolution of acetic acid and water, and during the last stages of the heating, the reflux condenser is disconnected or the batch is transferred to an open receptacle and heated to temperatures of 200° C. to 300° C. to remove the last traces of acetic acid and water and to secure the desired hardness of the product. The material does not present a sharp critical point, nor does it pass directly from a tacky or sticky soluble state to a hard insoluble state, but forms a hard, soluble resin-like material, the degree of hardness of which may be varied to a considerable extent by the length of time of heating.

In place of glycerol, other polyhydric alcohols, such as glycol, mannitol, etc. may be employed. In place of phthalic acid anhydride, anhydrides of other poly-basic acids may be used, such as succinic or maleic anhydride. Instead of acetic anhydride, anhydrides of other monobasic acids may be employed, for example, butyric or acrylic anhydrides.

The hard product is soluble in various esters such as ethyl acetate, ethyl lactate, glycol esters and the like; in ketones, for example, acetone or ethyl methyl ketone, in diacetone alcohol and in aromatic hydrocarbons, such as toluene or xylene, mixed with alcohols. The solutions have a high degree of mobility; thus, solutions containing up to 50% of the hard resinous product remain mobile. Drying or semi-drying oils such as linseed oil, soy bean oil, tung oil or the like may be incorporated in the solutions or may be incorporated in the resin prior to solution by heating the desired oils with the resin to temperatures of 200° to 300° C. Similarly ester gum, rosin or other natural resins, or synthetic resins may be used.

The proportions given in the above example are substantially monomolecular. The relative proportions may, however, be varied; for example, higher proportions of the polybasic acid may be employed with lower proportions of the anhydride of the monobasic acid and vice versa. Thus, desirable products have been obtained by employing glycerol and phthalic acid in the proportions of 92 parts of the former and 185 parts of the latter in the first stage of the reaction and 51 parts of acetic anhydride in the second stage; and also by employing 92 parts of glycerol and 111 parts phthalic acid in the first stage and 153 parts acetic anhydride in the second. It is thus apparent that the reactions are not limited to the use of monomolecular proportions.

The products prepared in accordance with the present invention may be dissolved in suitable solvents or solvent mixtures either alone or in admixture with nitrocellulose, cellulose acetate or other cellulose esters in wide proportions. The products have a mutual solvent action on such cellulose compounds and hence produce clear films. The proportions may range, for example, from 6 parts of the synthetic product to 1 part of nitrocellulose to 1 part resin to 2 parts nitrocellulose, and suitable proportions of plasticizers, such as triphenylphosphate, dibutylphthalate, di- or triacetin, or the like, may be incorporated, particularly with lower relative proportions of the synthetic resin. The usual solvents or solvent mixtures, for example, of toluene, alcohol, ethyl acetate, ethyl lactate and butyl or amyl acetate may be employed. The proportions of solids which may be introduced while maintaining a mobility suitable for spraying or brushing may vary from, say 10 to 16 ounces per gallon with high relative proportions of nitrocellulose to 50 to 60% solids with low relative proportions of nitrocellulose.

What I regard as new, and desire to secure by Letters Patent, is:

1. The process of producing a hard, soluble resin which comprises heating together a polyhydric alcohol and an anhydride of an organic dibasic acid to form a resinous material capable of further esterification, incorporating therewith an anhydride of an aliphatic monobasic acid and heating the mixture.

2. The process of producing a hard, soluble, resin-like product which comprises heating together glycerol and phthalic anhydride to produce a resin-like material capable of further esterification, incorporating therewith acetic anhydride and heating the mixture.

3. The process of producing a hard, soluble resin which comprises heating together monomolecular proportions of a polyhydric alcohol and an anhydride of an organic dibasic acid, thereby forming a resinous material, incorporating therewith monomolecular proportions of an anhydride of a monobasic aliphatic acid, and heating the mixture.

4. The process of producing a hard, soluble, resin-like product which comprises heating together monomolecular proportions of glycerol and phthalic anhydride, thereby forming a resin-like material, incorporating therewith monomolecular proportions of acetic anhydride and heating the mixture.

5. As a composition of matter, a hard, soluble resin-like condensation product of a polyhydric alcohol, an anhydride of an organic polybasic acid and an anhydride of a monobasic aliphatic acid.

6. A hard, resin-like condensation product of glycerol, phthalic anhydride and acetic anhydride, soluble in acetone, ethyl acetate, toluene or xylene mixed with alcohols.

7. As a composition of matter, a hard, soluble, resin-like condensation product of monomolecular proportions of a polyhydric alcohol, and an anhydride of an organic polybasic acid and an anhydride of a monobasic aliphatic acid, said product having an acid number at its gelation point of not over 9.

8. A hard, resin-like condensation product of monomolecular proportions of glycerol, phthalic anhydride and acetic anhydride, soluble in acetone, ethyl acetate, toluene or xylene mixed with alcohol.

9. The process of producing a hard, soluble, resin-like product which comprises heating together a polyhydric alcohol and an anhydride of an organic dibasic acid to form a resinous material capable of further esterification, continuing the heating until said product is hard and, while still soluble in acetone incorporating therewith an anhydride of a monobasic aliphatic acid, and heating the mixture.

10. The process of producing a hard, soluble resin which comprises heating together monomolecular proportions of glycerol and phthalic anhydride, continuing the heating to form a hard, resin-like material capable of further esterification, and while still soluble in acetone, incorporating acetic anhydride therewith, and heating the mixture.

11. The process of producing a hard, soluble resin of relatively low acid number which comprises heating an incompletely esterified condensation product of a polyhydric alcohol and an anhydride of a dibasic organic acid, said product being capable of further esterification with acid, together with an anhydride of a monobasic aliphatic acid to produce a completely esterified resin and free monobasic acid corresponding to the monobasic anhydride, and distilling off the free acid so produced.

GILBERT F. HOFFMANN.